United States Patent
Block et al.

(10) Patent No.: US 7,576,254 B2
(45) Date of Patent: Aug. 18, 2009

(54) OXIDATION OF ORGANIC COMPOUNDS AT HIGH PH

(75) Inventors: Philip A. Block, Chester Heights, PA (US); Richard A. Brown, Lawrenceville, NJ (US); David S. Robinson, Mount Laurel, NJ (US)

(73) Assignee: FMC Corporation, Philadelphia, PA (US)

( * ) Notice: Subject to any disclaimer, the term of this patent is extended or adjusted under 35 U.S.C. 154(b) by 137 days.

(21) Appl. No.: 10/589,767

(22) PCT Filed: Feb. 24, 2005

(86) PCT No.: PCT/US2005/005852

§ 371 (c)(1),
(2), (4) Date: May 24, 2007

(87) PCT Pub. No.: WO2005/081996

PCT Pub. Date: Sep. 9, 2005

(65) Prior Publication Data

US 2007/0280785 A1 Dec. 6, 2007

Related U.S. Application Data

(60) Provisional application No. 60/547,853, filed on Feb. 26, 2004.

(51) Int. Cl.
*B09C 1/00* (2006.01)

(52) U.S. Cl. .................... 588/320; 405/128.75
(58) Field of Classification Search ........... 588/320; 405/128.75
See application file for complete search history.

(56) References Cited

U.S. PATENT DOCUMENTS

| 5,207,925 | A | 5/1993 | Steiner |
| 5,849,201 | A * | 12/1998 | Bradley ............... 210/752 |
| 6,019,548 | A | 2/2000 | Hoag |
| 6,268,205 | B1 | 7/2001 | Kiest |
| 6,474,908 | B1 | 11/2002 | Hoag |
| 2002/0110509 | A1 * | 8/2002 | Lundy ................ 423/143 |

FOREIGN PATENT DOCUMENTS

| JP | 2002136961 A | 5/2002 |
| WO | WO 98/28044 A1 | 7/1998 |

OTHER PUBLICATIONS

Mehrvar et al, "Photocatalytic Degradation of Aqueous Organic Solvents in the . . . ", International Journal of Photoenergy, 2001 vol. 3, pp. 187-191. Ryerson Polytechnic Univ. Ontario, Canada.
Sun et al, "Chemical Treatment of Pesticide Wastes . . . " J. Agric. Food Chem. 1992, vol. 40, pp. 332-327. The Connecticut Agricultural Experiment Station, New Haven, Connecticut, USA.

* cited by examiner

*Primary Examiner*—John Kreck

(57) ABSTRACT

Organic compounds are removed from contaminated soil, ground water and the like by treatment with a combination of a water soluble peroxygen compound, such as sodium persulfate, and a pH modifier capable of maintaining a pH greater than about 10, such as a metal hydroxide.

17 Claims, No Drawings

OXIDATION OF ORGANIC COMPOUNDS AT HIGH PH

This application claims the benefit of U.S. Provisional Application No. 60/547,853 filed Feb. 26, 2004.

FIELD OF THE INVENTION

The present invention relates to the in situ and ex situ oxidation of organic compounds in soils, groundwater, process water and wastewater and especially relates to the in situ oxidation of volatile and semi-volatile organic compounds, pesticides and other recalcitrant organic compounds in soil and groundwater.

BACKGROUND OF THE INVENTION

The presence of volatile organic compounds (VOCs), semi-volatile organic compounds (SVOCs), pesticides, polychlorinated biphenyls (PCBs), polyaromatic hydrocarbons (PAHs) and total petroleum hydrocarbons (TPHs) in subsurface soils and groundwater is a well-documented and extensive problem in industrialized and industrializing countries. Notable among these are the volatile organic compounds or VOCs which include any at least slightly water soluble chemical compound of carbon, with a Henry's Law Constant greater than $10^{-7}$ atm $m^3$/mole, which is toxic or carcinogenic, is capable of moving through the soil under the influence of gravity and serving as a source of water contamination by dissolution into water passing through the contaminated soil due to its solubility, including, but not limited to, chlorinated solvents such as trichloroethylene (TCE), vinyl chloride, tetrachloroethylene (PCE), methylene chloride, 1,2-dichloroethane, 1,1,1-trichloroethane (TCA), 1,1-dichloroethane, 1,1-dichloroethene, carbon tetrachloride, benzene, chloroform, chlorobenzenes, and other compounds such as ethylene dibromide, and methyl tertiary butyl ether.

In many cases discharge of VOCs and other contaminants into the soil leads to contamination of aquifers resulting in potential public health impacts and degradation of groundwater resources for future use. Treatment and remediation of soils contaminated with VOCs and other organic contaminants have been expensive, require considerable time, and in many cases are incomplete or unsuccessful. Treatment and remediation of compounds that are either partially or completely immiscible with water (i.e., Non Aqueous Phase Liquids or NAPLs) have been particularly difficult. Also treatment of highly soluble but biologically stable organic contaminants such as MTBE and 1,4-dioxane are also quite difficult with conventional remediation technologies. This is particularly true if these compounds are not significantly naturally degraded, either chemically or biologically, in soil environments. NAPLs present in the subsurface can be toxic to humans and other organisms and can slowly release dissolved aqueous or gas phase volatile organic compounds to the groundwater resulting in long-term (i.e., decades or longer) sources of chemical contamination of the subsurface. In many cases subsurface groundwater contaminant plumes may extend hundreds to thousands of feet from the source of the chemicals resulting in extensive contamination of the subsurface. These chemicals may then be transported into drinking water sources, lakes, rivers, and even basements of homes through volatilization from groundwater.

The U.S. Environmental Protection Agency (USEPA) has established maximum concentration limits for various hazardous compounds. Very low and stringent drinking water limits have been placed on many halogenated organic compounds. For example, the maximum concentration limits for solvents such as trichloroethylene, tetrachloroethylene, and carbon tetrachloride have been established at 5 $\mu$g/L, while the maximum concentration limits for chlorobenzenes, polychlorinated biphenyls (PCBs), and ethylene dibromide have been established by the USEPA at 100 $\mu$g/L, 0.5 $\mu$/L, and 0.05 $\mu$g/L, respectively. Meeting these cleanup criteria is difficult, time consuming, costly, and often virtually impossible using existing technologies.

Many methods exist for the remediation of soil, groundwater and wastewater to meet the clean-up standards. Examples include dig-and-haul, pump-and-treat, biodegradation, sparging, and vapor extraction. However, meeting stringent clean-up standards is often costly, time-consuming, and often ineffective for many compounds that are recalcitrant—i.e. not responsive to such treatment.

Chemical oxidation, either applied in situ or ex situ of the subsurface or waste stream, is an approach to treat contaminants with strong oxidizing chemicals, with the ultimate goal of complete mineralization, or conversion to carbon dioxide and water. Examples of oxidants that have been utilized for this purpose include Fenton's chemistry (activated hydrogen peroxide), permanganate and ozone. Persulfates, and in particular sodium persulfate, have more recently been suggested for use in environmental remediation through chemical oxidation.

One key aspect to the ability of an oxidizer to function is its ability to permeate through the subsurface, interacting with target compounds throughout the entire zone of contamination. Oxidizing species, such as peroxide, ozone and hydroxyl radicals have relatively short lifetimes within the subsurface. Persulfate radicals survive for greater periods. However there is a desire to have even longer lived active species available for organic species decomposition in order to increase the zone of reaction, without resorting to multiple injection points throughout the contamination area.

SUMMARY OF THE INVENTION

The present invention relates to a method for the treatment of contaminated soil, sediment, sludge, clay, rock, and the like (hereinafter collectively referred to as "soil") containing volatile organic compounds, semi-volatile organic compounds, polychlorinated biphenyls, polyaromatic hydrocarbons, total petroleum hydrocarbons and pesticides, as well as the treatment of contaminated groundwater (i.e., water found underground in cracks and spaces in soil, sand and rocks), process water (i.e., water resulting from various industrial processes) or wastewater (i.e., water containing domestic or industrial waste, often referred to as sewage) containing these compounds.

The method of the present invention uses one or more water soluble oxidants in combination with a pH modifier, where the pH modifier maintains a pH greater than about 10.0. The combination is introduced into the soil or water in amounts, under conditions and in a manner which assures that the oxidizing compounds are able to contact and oxidize most, and preferably substantially all, the target organic compounds in the soil, groundwater, process water and/or wastewater, rendering them harmless.

DESCRIPTION OF THE PREFERRED EMBODIMENTS

In accordance with the present invention it has been found that a broad range of contaminants in an environmental medium can be effectively reduced or removed by treatment with a composition comprising a persulfate and a pH modifier capable of maintaining the pH greater than about 10.

Contaminants susceptible to treatment by the compositions of the present invention include: volatile organic compounds (VOCs); semi volatile organic compounds (SVOCs); polychlorinated biphenyls (PCBs); polyaromatic hydrocarbons (PHHs); total petroleum hydrocarbons (TPHs) including benzene, toluene, xylene and ethylbenzene; methyl t-butyl ether (MTBE); brominated solvents; 1,4-dioxane; gasoline additives and pesticides (insecticides, herbicides, etc.).

In accordance with the method of the present invention the contaminants are treated in an environmental medium. As used herein "environmental medium" refers to an environment where contaminants are found including, without limitation, soil, rock, groundwater, contaminated plumes, process water, waste water and the like.

The process of the present invention may be carried out in situ or ex situ. In situ treatment is conducted in the physical environment where the contaminant(s) are found. Ex situ treatment involves removal of the contaminated medium from the location where it is found and treatment at a different location.

In accordance with one embodiment of the present invention, the oxidation of volatile organic compounds at a contaminated site is accomplished by the injection into contaminated soil of a composition comprising a persulfate and a compound capable of maintaining a pH greater than about 10 into soil.

In a preferred form of the invention, a composition comprising sodium persulfate ($Na_2S_2O_8$) and a metal hydroxide (potassium hydroxide, sodium hydroxide, calcium hydroxide) is introduced into contaminated soil.

For in situ soil treatment, injection rates must be chosen based upon the hydro geologic conditions, that is, the ability of the oxidizing solution to displace, mix and disperse with existing groundwater and move through the soil. Additionally, injection rates must be sufficient to satisfy the soil oxidant demand and chemical oxidant demand in a realistic time frame. It is advantageous to clean up sites in both a cost effective and timely manner. Careful evaluation of site parameters is crucial. It is well known that soil permeability may change rapidly both as a function of depth and lateral dimension. Therefore, injection well locations are also site specific. Proper application of any remediation technology depends upon knowledge of the subsurface conditions, both chemical and physical, and this process is not different in that respect.

Any solid phase water soluble persulfate compound can be used including monopersulfates and dipersulfates. Dipersulfates are preferred because they are inexpensive and survive for long periods in the groundwater saturated soil under typical site conditions.

The most preferred dipersulfate is sodium persulfate as it has the greatest solubility in water and is least expensive. Moreover, it generates sodium and sulfate upon reduction, both of which are relatively benign from environmental and health perspectives. Potassium persulfate and ammonium persulfate are examples of other persulfates which might be used. Potassium persulfate, however, is an order of magnitude less soluble in water than sodium persulfate; and ammonium persulfate is even less desirable as it may decompose into constituents which are potential health concerns.

In accordance with the process of the present invention, organic compounds are oxidized by contacting the organic compound with a composition comprising (a) a water soluble peroxygen compound and (b) a pH modifier—i.e., any compound which is capable of maintaining the pH greater than about 10 in its intended environment. The quantity of the pH modifier that needs to be added is that amount which is sufficient to maintain the pH of at least 10 throughout the course of the contaminant decomposition by the peroxygen.

This pH modification methodology may also be used ex situ to treat quantities of contaminated soil which have been removed from the ground.

According to another aspect of the present invention, under conditions where metal cations are present in the contaminated soil or water, the persulfate and pH modifier composition may be introduced into the contaminated soil to remove the target compounds. The metal cations act catalytically to decompose the persulfate to form sulfate free radicals, which oxidize the target VOCs. In another embodiment of the invention, catalysts, such as metals and chelated metal complexes, may also be added either in combination, sequential fashion or multiple sequential steps either to the addition of the pH modifier, the addition of the persulfate, or the addition of a combination of the pH modifier and the persulfate.

Catalysts which may be used to enhance the effects of the persulfate/hydrogen peroxide include divalent and trivalent transition metals such as Fe (II), FE (III), Cu (II), Mn (II) and Zn (II). The metal may be added in the form of a salt or a chelate. Prefereed chelants which may be used include ethylenediamine tetraacetic acid, citric acid, phosphate, phosphonates, glucoheptonates, aminocarboxylates, polyacrylates, catechol and nitroacetic acid.

As per another aspect of the present invention, the persulfate and pH modifier composition may be introduced into the soil, followed by heating of the soil to active the persulfate free radicals. Likewise, the persulfate and pH modifier composition may be introduced into soil that has already been pre-heated for activation of persulfate free radicals.

The exact material employed as the pH modifier is not critical as long as the material is capable of maintaining a pH of at least about 10 in the environment being treated. In addition to potassium and sodium hydroxide, examples of other pH modifiers that may be used include phosphate compounds, such as sodium tripolyphosphate, and carbonate compounds, such as soda ash. The persulfate and pH modifier, if being compatible with each other, may be mixed together and shipped or stored prior to being combined with water in the same vessel prior to injection. However, it is also possible to combine the two ingredients to prepare the composition at the site. Alternatively, the persulfate and the pH modifier may be injected sequentially at the site and the composition formed in situ. The amount of pH modifier used should be sufficient to maintain a pH of at least about 10 taking into account the formation of sulfuric acid from the persulfate decomposition, and any nascent soil pH effects.

It is preferred that enough persulfate is present to satisfy substantially all the soil oxidant demand and to destroy the target compounds to acceptable levels, or as close thereto as possible, and enough pH modifier is present to maintain a pH of at least about 10.

Depending upon the type of soil, target compounds, and other oxidant demand by the site, the concentration of persulfate used in the present invention may vary from 0.5 g/L to greater than 250,000 mg/L. The preferred concentrations are a function of the soil characteristics, including the site-specific oxidant demands. Hydrogeologic conditions govern the rate of movement of the chemicals through the soil, and those conditions must be considered together with the soil chemistry to understand how best to perform the injection. The techniques for making these determinations and performing the injections are well known in the art. For example, wells or borings can be drilled at various locations in and around the suspected contaminated site to determine, as closely as possible, where the contamination is located. Core samples can be withdrawn, being careful to protect the samples from atmospheric oxidation. The samples can then be used to determine soil oxidant demand and chemical (e.g. VOC) oxidant demand and the oxidant stability existing in the subsurface. The precise chemical compounds in the soil and their concentration can be determined. Contaminated groundwater can be collected. Oxidants can be added to the collected groundwater during laboratory treatability experiments to determine which compounds are destroyed, in what order and to what degree, in the groundwater. It can then be determined whether the same oxidants are able to destroy those chemicals in the soil environment.

One method for calculating the preferred amount of peroxygen compound to be used per unit soil mass (for an identified volume of soil at the site) is to first determine the minimum amount of persulfate needed to fully satisfy soil oxidant demand per unit mass of uncontaminated soil. A contaminated soil sample from the identified volume of soil is then treated with that predetermined (per unit mass) amount of persulfate; and the minimum amount of peroxygen compound required to eliminate the organic compounds in that treated sample is then determined. Chemical reaction stoichiometry governs the mass/mass ratios and thus the total amount required to achieve the desired result. In actuality the amount of peroxygen compound injected into various locations at a single contaminated site will vary depending upon what is learned from the core samples and other techniques for mapping what is believed to be the subsurface conditions.

The goal is for the concentration of peroxygen compound in the injected solution to be just enough to result in the peroxygen compound reaction front traveling throughout the area of contamination requiring treatment in sufficient quantity to oxidize the contaminants present. (The saturated soil zone is the zone of soil which lies below the water table and is fully saturated. This is the region in which groundwater exists and flows.) In certain saturated soil zones where the natural velocity of the groundwater is too slow for the purposes of treatment within a certain timeframe, the velocity of groundwater can be increased by increasing the flow rate of the injected solution or installation of groundwater extraction wells to direct the flow of the injected peroxygen compound solution. Certain soils to be treated may be in unsaturated zones and the method of peroxygen compound injection may be based on infiltration or trickling of the peroxygen compound solution into the subsurface to provide sufficient contact of the soils with the injected chemicals. Certain soils and conditions will require large amounts of peroxygen compound to destroy soil oxidant demand, while other soils and conditions might not. For example, sandy soils having large grain size might have very little surface area, very little oxidizable compounds and therefore very little soil oxidant demand. On the other hand, silty or clayey soils, which are very fine grained, would have large surface area per unit volume. They are likely to also contain larger amounts of oxidizable compounds and thus have a higher overall soil oxidant demand.

In addition to in situ applications the process may also be employed ex situ. In addition to soil it may be used to treat sludges, sands, tars, groundwater, wastewater, process water, industrial water or any other environment in which contaminants susceptible to oxidation are found.

In order to describe the invention in more detail, the following examples are set forth:

EXAMPLE 1

Destruction of Common Highly Recalcitrant Compounds

Chlorinated ethanes and chlorinated methanes are contaminants known to be very difficult to destroy. Alkaline activation of sodium persulfate was tested as a means to effectively decompose these recalcitrant compounds. The study utilized amber glass, volatile organic analysis (VOA) sample jars. The VOA jars were filled with water and measured amounts of 1,1,1-trichloroethane (1,1,1-TCA), 1,1,2-trichloroethane (1,1,2-TCA), 1,2-dichloroethane (1,2-DCA), 1,1-dichloroethane (1,1-DCA), carbon tetrachloride, methylene chloride and vinyl chloride. Sodium persulfate was added at concentration of 25 g/L, and potassium hydroxide (KOH) was added to achieve either a 0.5 mol ratio KOH to persulfate (resulting pH at day 14=10.5) or a 0.8 mol ratio (resulting pH at day 14=13). Controls were included which contained no persulfate or KOH. Zero headspace was maintained during the study to insure that the contaminants were not undergoing volatilization.

The samples were kept a room temperature for a period of fourteen days. At that time, the samples were analyzed via GC-MS for contaminant concentration. Comparison to the control samples were made. The results are shown in Table 1. The results demonstrate that the addition of alkaline persulfate reduces the majority of the recalcitrant compounds to non-detect levels, with the exception being 1,1,1-TCA, where an 82% reduction compared to the control was observed.

TABLE 1

Destruction of Recalcitrant Compounds with Alkaline Persulfate - Day 14 Results

| µg/L | Control Day 14 | 0.5 mol KOH: Persulfate | 0.8 mol KOH: Persulfate |
|---|---|---|---|
| 1,1,1-TCA | 19,000 | 14,400 | 3,400 |
| 1,1,2-TCA | 25,000 | ND | ND |
| 1,2-DCA | 22,000 | ND | ND |
| 1,1-DCA | 17,000 | 1,600 | ND |
| Carbon Tetrachloride | 18,000 | ND | ND |
| Methylene Chloride | 20,000 | ND | ND |
| Vinyl Chloride | 195 | ND | ND |

ND—non detect

EXAMPLE 2

Treatment of Carbon Tetrachloride and Chloroform

Amber VOA vials were utilized and filled with water containing 250 mg/L of carbon tetrachloride and 50 mg/L of chloroform. The vials were filled to insure zero headspace in order to prevent volatilization of the contaminant species. Sodium persulfate was added to a concentration of 22 g/L, and sodium hydroxide was added to maintain a pH between 11 and 12. Control samples were prepared in which only sodium hydroxide was added to maintain a pH between 11 and 12, but without sodium persulfate.

The samples were sacrificed and analyzed for contaminant concentration via GC-MS after 3, 9, 19 and 47 days. The data is shown in Table 2.

From these results, it is shown that greater than 99% of the carbon tetrachloride is destroyed by the alkaline persulfate. Chloroform is also significantly decreased with the combination even when compared to the decrease achieved with the sodium hydroxide alone due to the alkaline hydrolysis of the chloroform.

organic analysis (VOA) vials for analysis via EPA Method 8260B. After decanting, the soil was quickly transferred to a 4 oz jar, which was analyzed via the EPA Method 8260B after methanol extraction. Concentration ($C_{hs}$) of the contaminant in the headspace of the vial was calculated from the measured aqueous phase concentration and Henry's constant. The volume of the headspace was determined by marking the soil-water mixture height in the jar, and then after sampling, measuring the volume of water needed to fill the jar to the top from the level mark. Results from the study can be found in Table 3.

TABLE 3

| Time (days) | Control | Persulfate Only | KOH Activation |
|---|---|---|---|
| MTBE | | | |
| 0 | 14,600 | 14,600 | 14,600 |
| 1 | 14,000 | 16,000 | 14,000 |
| 3 | 14,000 | 16,000 | 13,000 |
| 8 | 14,000 | 14,000 | 15,000 |

TABLE 2

| | 3-Day Results | | 9-Day Results | | | 19-Day Results | | | | 47-Day Results | | | |
|---|---|---|---|---|---|---|---|---|---|---|---|---|---|
| | Carbon Tet Mg/L | Chloroform mg/L | Persulfate mg/L | pH s.u | Carbon Tet mg/L | Chloroform mg/L | Persulfate mg/L | pH s.u | Carbon Tet mg/L | Chloroform mg/L | Persulfate mg/L | pH s.u | Carbon Tet mg/L | Chloroform mg/L |
| 0 g/L persulfate | 160 | 45.2 | NA | 11.85 | 193 | 34.4 | NA | 11.90 | 200 | 21.4 | NA | 12.11 | 207 | 9.88 |
| 22 g/L persulfate | 124 | 29.6 | 18,461 | 11.52 | 98.6 | 19.7 | 17,200 | 11.46 | 47.6 | 15.7 | 11,700 | 11.29 | 0.051 | 5.18 |

EXAMPLE 3

Testing in Soil/Water Mixtures

De-ionized (DI) water was used for this study. The soil used was "fill sand" [Nimbus Landscaping Materials, Rancho Cordova, Calif.], with approximately 85% of the sand <30 mesh (600 microns). The soil contained 3.7 g/kg total organic carbon (TOC) and 17 g/kg iron.

Samples, containing 300 mL DI water and 150 g of soil were prepared in 500 mL amber glass, wide mouth bottles. Each bottle was spiked with a 500 μL aliquot of methanol stock solution using a glass gas-tight syringe. The stock solution contained MTBE (methyl tert-butyl ether), CT (carbon tetrachloride), TCA (1,1,1-trichloroethane), TCE (trichloroethene) and benzene, such that the initial concentration of each of the contaminant in the reactor bottle was about 20 mg/L. The bottles were then capped and placed on a shaker table for three weeks to equilibrate.

After the samples reached equilibrium, persulfate and KOH were spiked into them at a concentration of 5 g/L for persulfate and 0.01 mol/L KOH. KOH was re-spiked after day three in order to maintain a pH above 11. Enough dionized water was added to obtained a total volume in the jar of 350 mL.

Periodically, one replicate from each series was destructively sampled. Approximately 200 ml of the soil-water mixture was quickly decanted into a 225 ml centrifuge tube, and then centrifuged at 4400 rpm for 5 minutes. A portion of the aqueous phase was then decanted into HCl-preserved volatile

TABLE 3-continued

| Time (days) | Control | Persulfate Only | KOH Activation |
|---|---|---|---|
| 24 | 14,000 | 13,000 | 6,700 |
| 24 (soil) | 2,200 | 1,900 | 960 |
| 1,1,1-Trichloroethane | | | |
| 0 | 8,600 | 8,600 | 8,600 |
| 1 | 3,500 | 7,600 | 4,100 |
| 3 | 4,800 | 8,200 | 7,500 |
| 8 | 2,400 | 2,900 | 3,500 |
| 24 | 2,700 | 6,600 | 93 |
| 24 (soil) | 290 | 670 | <20 |
| Carbon Tetrachloride | | | |
| 0 | 5,800 | 5,800 | 5,800 |
| 1 | 1,800 | 4,700 | 2,200 |
| 3 | 2,700 | 5,100 | 4,400 |
| 8 | 1,300 | 1,400 | 1,500 |
| 24 | 1,100 | 3,600 | <20 |
| 24 (soil) | 130 | 370 | <20 |
| Benzene | | | |
| 0 | 9,400 | 9,400 | 9,400 |
| 1 | 6,400 | 4,000 | 3,300 |
| 3 | 8,100 | 5,900 | 5,900 |
| 8 | 5,400 | 1,400 | 2,500 |
| 24 | 7,300 | 100 | 19 |
| 24 (soil) | 1,000 | 17 | <5 |
| Trichloroethene | | | |
| 0 | 8,600 | 8,600 | 8,600 |
| 1 | 4,500 | 4,700 | 3,300 |
| 3 | 5,900 | 6,100 | 5,700 |
| 8 | 3,100 | 1,500 | 2,100 |

TABLE 3-continued

| Time (days) | Control | Persulfate Only | KOH Activation |
|---|---|---|---|
| 24 | 4,600 | 440 | 44 |
| 24 (soil) | 690 | 89 | <20 |

The results demonstrate that the alkaline activated persulfate significantly decreased the concentration of all contaminants in both the aqueous and soil phases as compared to the control with no persulfate.

EXAMPLE 4

Samples were generated by adding the contaminants listed in the table, with sodium persulfate and potassium hydroxide (KOH), to distilled water in 40 mL VOA bottle. The concentrations of the contaminants were set so that their initial concentrations were on the order of 10-20 mg/L (see table). The sodium persulfate was dosed so that its concentration was 25 mg/L, and KOH was dosed to give a mole ratio of KOH to persulfate in the range of 0.2, 0.38, 0.5 or 0.8. A mole ratio of 0.38 KOH: persulfate generated a pH of 11.5 after 7 days and 10.5 after 14 days.

The study was run with zero headspace. The VOA jars were capped and placed in a sealed box and kept on a shaker table for seven days. At the end of the seven days, the jars were sacrificed and the samples were analyzed for contaminant concentration by GC-MS. The results are shown in Table 4.

TABLE 4

| | | | | T = 7 days | | | |
|---|---|---|---|---|---|---|---|
| Contaminant µg/L | T = 0 | Control no persulfate no KOH | Persulfate only | KOH:Persulfate 0.2 pH = 4.3 | KOH:Persulfate 0.38 pH = 11.5 | KOH:Persulfate 0.5 pH = 11.5 | KOH:Persulfate 0.8 pH = 12.2 |
| Perchloroethylene | 16,636 | 10,010 | 7,827 | 4,255 | 1,803 | 1,607 | 3,040 |
| Trichloroethylene | 23,024 | 13,830 | 7,970 | 2,445 | 370 | 196 | 554 |
| 1,1-dichloroethene | 20,728 | 13,996 | 2,082 | 700 | 0 | 398 | 432 |
| Cis 1,2-dichloroethene | 20,728 | 13,620 | 7,645 | 3,634 | 404 | 332 | 1161 |
| Trans 1,2-dichloroethene | 4,296 | 3,088 | 1,055 | 778 | 0 | 44 | 145 |
| 1,1,1-trichloroethane | 23,468 | 16,596 | 12,929 | 21,119 | 14,090 | 14,377 | 11,688 |
| 1,1,2-trichloroethane | 29,158 | 17,402 | 11,182 | 173 | 0 | 144 | 23 |
| 1,1-dichloroethane | 27,252 | 13,369 | 16,753 | 18,108 | 4266 | 923 | 335 |
| 1,2-dichloroethane | 19,936 | 13,137 | 13,316 | 14,558 | 7184 | 490 | 186 |
| Carbon tetrachloride | 22,834 | 16,218 | 13,044 | 7,944 | 0 | 63 | 3 |
| Methylene chloride | 21,546 | 13,718 | 13,241 | 15,298 | 4,670 | 721 | 234 |
| Benzene | 24,544 | 13,206 | 5,971 | 527 | 0 | 225 | 728 |
| Toluene | 23,878 | 13,970 | 2,443 | 95 | 0 | 0 | 30 |
| Ethyl benzene | 20,572 | 10,081 | 4,100 | 727 | 0 | 28 | 30 |
| m,o-xylene | 17,338 | 11,225 | 2,404 | 574 | 0 | 0 | 28 |
| Chlorobenzene | 15,308 | 8,655 | 461 | 710 | 119 | 208 | 446 |
| 1,2-dichlorobenzene | 17,408 | 9,938 | 7,827 | 6,454 | 410 | 1010 | 1056 |
| 1,3-dichlorobenzene | 14,468 | 8,798 | 11,913 | 6,761 | 236 | 727 | 738 |
| 1,2,4-trichlorobenzene | 8,192 | 6,081 | 10,977 | 11,499 | 490 | 2959 | 1292 |
| Methyl tert-butyl ether | 20,754 | 10,788 | 13,316 | 10,106 | 4,759 | 934 | 503 |
| 1,4-dioxane | — | 25,470 | 18,340 | 19,340 | 1,021 | 0 | 0 |
| Methyl iso-butyl ketone | 36,302 | 20,909 | 10,519 | 15,570 | 1,015 | 148 | 82 |

From these results, it can be observed that at mole ratios of KOH to sodium persulfate in excess of 0.38, significant reductions in a broad range of contaminants, including chlorinated ethenes, chlorinated ethanes, chlorinated methanes, chlorinated benzenes, BTEX, and oxygenates, can be achieved. Results at a mole ratio of 0.2 KOH; persulfate (pH of 4.3) are also shown for comparison.

What is claimed is:

1. A method for oxidizing an organic compound consisting essentially of contacting the organic compound with a composition consisting essentially of a persulfate, a pH modifier which maintains the pH of the composition at greater than about 10, and optionally a catalyst.

2. A method as in claim 1, wherein the organic compound is present in soil, sludge, sediment, bedrock, groundwater, process water or wastewater.

3. A method as in claim 1, wherein the organic compound is selected from the group consisting of volatile organic compounds, semi-volatile organic compounds, non-halogenated and halogenated solvents, polyaromatic hydrocarbons, total petroleum hydrocarbons, polychlorinated biphenyls, chlorinated benzenes, gasoline additives and pesticides.

4. The method as in claim 1, wherein the peroxygen compound is a dipersulfate.

5. The method as in claim 4, wherein the dipersulfate is selected from sodium, potassium or ammonium persulfate or a combination thereof.

6. The method as in claim 1, wherein the peroxygen compound is a monopersulfate.

7. The method as in claim 6, wherein the monopersulfate is selected from sodium and potassium monopersulfate.

8. The method as in claim 1, wherein the peroxygen compound is a combination of a dipersulfate and a monopersulfate.

9. The method as in claim 8 where the pH modifier is a metal hydroxide or sodium tripolyphosphate.

10. The method as in claim 1 wherein the pH modifier is sodium hydroxide, potassium hydroxide or calcium hydroxide.

11. The method as in claim 1, wherein the composition is introduced into soil in sufficient quantities and under conditions to oxidize substantially all the volatile organic compounds in the soil.

12. The method as in claim 1, wherein the composition is introduced into the soil either in situ or ex situ.

13. The method as in claim 11 wherein the persulfate is added either together with the pH modifier, in sequence with the pH modifier, or in multiple, sequential addition steps with the pH modifier.

14. The method as in claim 12, wherein the soil is heated to a temperature up to 99 degrees C.

15. The method as in claim 1, wherein the composition further includes a catalyst.

16. The method as in claim 15 wherein the catalyst consists of a divalent or trivalent transition metal.

17. The method as in claim 15 wherein the catalyst consists of a divalent or trivalent transition metal in combination with a chelating agent.

* * * * *

UNITED STATES PATENT AND TRADEMARK OFFICE
CERTIFICATE OF CORRECTION

PATENT NO. : 7,576,254 B2
APPLICATION NO. : 10/589767
DATED : August 18, 2009
INVENTOR(S) : Philip A. Block et al.

It is certified that error appears in the above-identified patent and that said Letters Patent is hereby corrected as shown below:

In Col. 10, line 17
replace "peroxygen compound"
with "persulfate"

In Col. 10, line 22
replace "peroxygen compound"
with "persulfate"

In Col. 10, line 27
replace "peroxygen compound"
with "persulfate"

Signed and Sealed this

Tenth Day of November, 2009

David J. Kappos
*Director of the United States Patent and Trademark Office*